United States Patent
Wang et al.

(10) Patent No.: US 10,554,057 B1
(45) Date of Patent: Feb. 4, 2020

(54) ACTIVE DISCHARGING HIGH VOLTAGE DIRECT CURRENT BUS SYSTEM AND METHOD FOR A VEHICLE

(71) Applicant: GM Global Technology Operations LLC, Detroit, MI (US)

(72) Inventors: Konking Wang, Canton, MI (US); Kris Sevel, Rochester Hills, MI (US); Steven V. Wybo, Grosse Pointe Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/183,051

(22) Filed: Nov. 7, 2018

(51) Int. Cl.
| | |
|---|---|
| H02J 7/00 | (2006.01) |
| H02P 27/06 | (2006.01) |
| B60L 3/00 | (2019.01) |
| B60K 6/26 | (2007.10) |
| B60K 6/28 | (2007.10) |
| B60L 50/51 | (2019.01) |
| B60L 58/10 | (2019.01) |

(52) U.S. Cl.
CPC .......... *H02J 7/0029* (2013.01); *B60L 3/0007* (2013.01); *H02J 7/0065* (2013.01); *H02P 27/06* (2013.01); *B60K 6/26* (2013.01); *B60K 6/28* (2013.01); *B60L 50/51* (2019.02); *B60L 58/10* (2019.02); *B60Y 2200/91* (2013.01); *B60Y 2200/92* (2013.01); *H02J 2007/0067* (2013.01)

(58) Field of Classification Search
CPC ...... H02P 1/00; H02P 1/04; H02P 1/46; H02P 1/465; H02P 3/00; H02P 3/18; H02P 3/16; H02P 3/24; H02P 6/00; H02P 6/12; H02P 6/14; H02P 21/00; H02P 23/00; H02P 25/00; H02P 27/00; H02P 27/04; H02P 27/06; G01R 31/00
USPC .... 318/400.01, 400.02, 400.14, 400.15, 700, 318/701, 721, 727, 779, 799, 800, 801, 318/430, 432; 324/500, 509, 135; 363/35, 51
See application file for complete search history.

(56) References Cited

U.S. PATENT DOCUMENTS

2009/0021871 A1\* 1/2009 Moran ...................... B60K 6/28
361/15

\* cited by examiner

*Primary Examiner* — Antony M Paul (57) ABSTRACT

A discharge control system of a vehicle includes a traction power inverter module (TPIM) configured to convert a first direct current (DC) voltage output by a first battery to alternating current (AC) power and apply the AC power to an electric motor. An accessory power module (APM) is configured to convert the first DC voltage into a second DC voltage of a second battery. A voltage calculation module is configured to, when the first DC voltage is less than an operation threshold voltage of the APM, determine the second DC voltage based on a function of the first DC voltage and the operation threshold voltage. A diagnostic module is configured to indicate whether a discharge fault is present. A discharge control module is configured to, when the discharge fault is present, based the first DC voltage and the second DC voltage, selectively control operation of the TPIM and the APM.

20 Claims, 4 Drawing Sheets

ACTIVE DISCHARGING HIGH VOLTAGE DIRECT CURRENT BUS SYSTEM AND METHOD FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to actively discharging a high voltage direct current bus.

A vehicle may include an engine that combusts air/fuel mixture to generate drive torque. An engine control module (ECM) controls the engine. The vehicle may also include one or more electric motors. An electric motor can act as either a generator or as a motor at a given time. When acting as a motor, the electric motor generates torque that may be used, for example, to supplement or replace torque output by the engine.

When acting as a generator, an electric motor converts mechanical energy into electrical energy. The electrical energy may be, for example, used to charge a high voltage (HV) battery. An accessory power module (APM) provides power to accessory loads from a low voltage (LV) battery. The APM includes a direct current (DC) to direct current (DC) converter that converts power from a DC voltage of the HV battery into one or more other DC voltages, such as a DC voltage of the LV battery.

SUMMARY

In a feature, a discharge control system of a vehicle includes a traction power inverter module (TPIM) configured to convert a first direct current (DC) voltage output by a first battery to alternating current (AC) power and to apply the AC power to an electric motor. An accessory power module (APM) is configured to convert the first DC voltage into a second DC voltage of a second battery, where the second DC voltage is less than the first DC voltage. A voltage calculation module is configured to, when the first DC voltage is less than an operation threshold voltage of the APM, determine the second DC voltage based on a function of the first DC voltage and the operation threshold voltage. A diagnostic module is configured to indicate whether a discharge fault is present. A discharge control module is configured to, when the discharge fault is present, based on at least one of the first DC voltage and the second DC voltage, selectively control operation of at least one of (i) the TPIM and (ii) the APM.

In further features, the discharge control module is configured to, when the first DC voltage is greater than a first high voltage (HV) threshold and the discharge fault is present, at least one of: operate the TPIM to apply the AC power to windings of the electric motor; and operate the APM to convert the first DC voltage into the second DC voltage.

In further features, the discharge control module is configured to, when the first DC voltage is less than the first HV threshold and greater than a second HV threshold and the discharge fault is present, at least one of: operate the TPIM to apply the AC power to windings of the electric motor; and operate the APM to convert the first DC voltage into the second DC voltage.

In further features, the discharge control module is configured to, when the first DC voltage is less than the second HV threshold and greater than a third HV threshold and the discharge fault is present, operate the APM to convert the first DC voltage into the second DC voltage and not operate the TPIM to apply the AC power to windings of the electric motor.

In further features, the discharge control module is configured to, when the second DC voltage is greater than a first low voltage (LV) threshold and the discharge fault is present, at least one of: operate the TPIM to apply the AC power to windings of the electric motor; and operate the APM to convert the first DC voltage into the second DC voltage.

In further features, the discharge control module is configured to, when the second DC voltage is less than the first LV threshold and greater than a second LV threshold and the discharge fault is present, at least one of: operate the TPIM to apply the AC power to windings of the electric motor; and operate the APM to convert the first DC voltage into the second DC voltage.

In further features, the discharge control module is configured to, when the second DC voltage is less than the second LV threshold and greater than a third LV threshold and the discharge fault is present, operate the APM to convert the first DC voltage into the second DC voltage and not operate the TPIM to apply the AC power to windings of the electric motor.

In further features, the discharge control module is configured to: when the first DC voltage is greater than a first high voltage (HV) threshold and the discharge fault is present: operate the TPIM to apply the AC power to windings of the electric motor; and operate the APM to convert the first DC voltage into the second DC voltage. When the second DC voltage is greater than a first low voltage (LV) threshold and the discharge fault is present: operate the TPIM to apply the AC power to windings of the electric motor; and operate the APM to convert the first DC voltage into the second DC voltage.

In further features, the discharge control module is configured to: when the first DC voltage is less than the first HV threshold and greater than a second HV threshold and the discharge fault is present: operate the TPIM to apply the AC power to windings of the electric motor; and operate the APM to convert the first DC voltage into the second DC voltage. When the second DC voltage is less than the first LV threshold and greater than a second LV threshold and the discharge fault is present: operate the TPIM to apply the AC power to windings of the electric motor; and operate the APM to convert the first DC voltage into the second DC voltage.

In further features, the discharge control module is configured to: when the first DC voltage is less than the second HV threshold and greater than a third HV threshold and the discharge fault is present, operate the APM to convert the first DC voltage into the second DC voltage and not operate the TPIM to apply the AC power to windings of the electric motor; and when the second DC voltage is less than the second LV threshold and greater than a third LV threshold and the discharge fault is present, operate the APM to convert the first DC voltage into the second DC voltage and not operate the TPIM to apply the AC power to windings of the electric motor.

In further features, the discharge control module is further configured to, when the first DC voltage is less than the operation threshold voltage and the discharge fault is present, maintain operation of the APM for a second predetermined period.

In further features, the discharge control module is further configured to, when the second DC voltage is less than the operation threshold voltage and the discharge fault is present, maintain operation of the APM in current mode for a third predetermined period.

In further features, the second predetermined period is less than eight seconds and the third predetermined period is greater than eight seconds.

In further features, the APM is further configured to, when the second DC voltage falls below a predetermined voltage for less than a fourth predetermined period and subsequently becomes greater than the fourth predetermined period, provide current to the TPIM for the third predetermined period.

In further features, the discharge control module is further configured to, when the second DC voltage falls below a predetermined voltage for less than a fourth predetermined period and subsequently becomes greater than the fourth predetermined period, wake-up the TPIM.

In a feature, a discharge control method includes: by a traction power inverter module (TPIM), converting a first direct current (DC) voltage output by a first battery to alternating current (AC) power and applying the AC power to an electric motor; by an accessory power module (APM), converting the first DC voltage into a second DC voltage of a second battery, where the second DC voltage is less than the first DC voltage; when the first DC voltage is less than an operation threshold voltage of the APM, determining the second DC voltage based on a function of the first DC voltage and the operation threshold voltage; indicating whether a discharge fault is present; and when the discharge fault is present, based on at least one of the first DC voltage and the second DC voltage, selectively controlling operation of at least one of (i) the TPIM and (ii) the APM.

In further features, the discharge control method further includes, when the first DC voltage is greater than a first high voltage (HV) threshold and the discharge fault is present, at least one of: operating the TPIM to apply the AC power to windings of the electric motor; and operating the APM to convert the first DC voltage into the second DC voltage.

In further features, the discharge control method further includes, when the first DC voltage is less than the first HV threshold and greater than a second HV threshold and the discharge fault is present, at least one of: operating the TPIM to apply the AC power to windings of the electric motor; and operating the APM to convert the first DC voltage into the second DC voltage.

In further features, the discharge control method further includes, when the first DC voltage is less than the second HV threshold and greater than a third HV threshold and the discharge fault is present, operating the APM to convert the first DC voltage into the second DC voltage and not operating the TPIM to apply the AC power to windings of the electric motor.

In further features, the discharge control method further includes, when the second DC voltage is greater than a first low voltage (LV) threshold and the discharge fault is present, at least one of: operating the TPIM to apply the AC power to windings of the electric motor; and operating the APM to convert the first DC voltage into the second DC voltage.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

and

In the drawings, reference numbers may be reused to identify similar and/or identical elements.

DETAILED DESCRIPTION

A hybrid or electric vehicle may be propelled by an electric motor that is powered by a high voltage (HV) battery. A high voltage (HV) direct current (DC) bus connects the HV battery to various HV components, including an accessory power module (APM), a traction power inverter module (TPIM), an electric heater, and other suitable HV components. The APM provides power to accessory loads. The APM includes a direct current (DC) to direct current (DC) converter that converts power from a DC voltage of the HV battery into one or more other DC voltages, such as a DC voltage for charging the low voltage (LV) battery and/or powering the accessory loads.

Under some circumstances, the HV DC bus may need to be discharged to a predetermined voltage threshold (e.g., less than 60 volts) within a first predetermined period (e.g., less than five seconds). However, voltage in the HV DC bus may remain too high (e.g., greater than the predetermined voltage threshold) after the HV battery has been disconnected, due to energy stored in a capacitor on the HV DC bus. Additionally, a discharge fault condition may prevent the LV battery from being used to discharge the energy stored in the capacitor and reduce the voltage in the HV DC bus to the predetermined voltage threshold (e.g., less than 60 volts). For example, a short to ground fault condition is present when the LV battery is shorted to ground.

According to the present disclosure, a discharge control module may monitor an input and output voltage of the APM and discharge the HV DC bus to the predetermined voltage threshold (e.g., less than 60 volts) within the first predetermined period (e.g., less than five seconds). For example, when the input voltage is greater than a first HV threshold or the output voltage is greater than a first LV threshold, the discharge control module may utilize the TPIM and the APM to discharge the HV DC bus. When the input voltage is less than the first HV threshold and greater than a second HV threshold, or when the output voltage is less than the first LV threshold and greater than a second LV threshold, the discharge control module may discharge the HV DC via the TPIM and APM. When the input voltage is less than the second HV threshold and greater than a third HV threshold, or the output voltage is less than the second LV threshold and greater than a third LV threshold, the discharge control module may discharge the HV DC bus via the APM.

Figure 1:
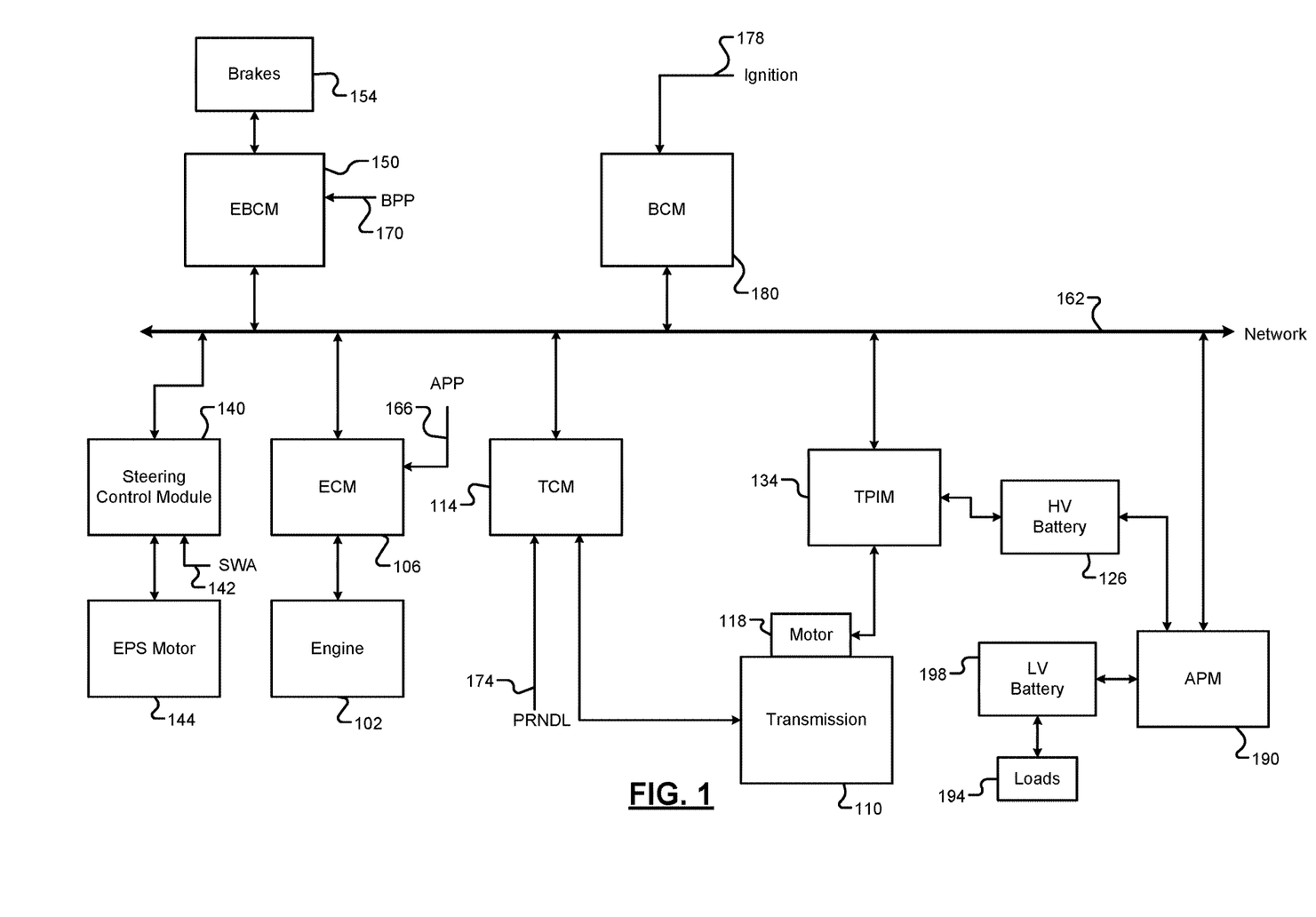
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles, fuel cell vehicles, and other types of vehicles. The present disclosure is applicable to autonomous vehicles, semi-autonomous vehicles, non-autonomous vehicles, and other types of vehicles.

An engine 102 combusts an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented outside the transmission 110 as shown in the example of FIG. 1. Additionally or alternatively, the electric motor 118 may be implemented within the transmission 110. An electric motor can act as either a generator or as a motor at a given time. When acting as a generator, an electric motor converts mechanical energy into electrical energy. The electrical energy can be, for example, used to charge a high voltage (HV) battery 126 via a traction power inverter module (TPIM) 134. When acting as a motor, an electric motor generates torque that may be used, for example, to supplement or replace torque output by the engine 102. While the example of one electric motor is provided, the vehicle may include zero or more than one electric motor.

The TPIM 134 may control the application of power from the HV battery 126 to the electric motor 118. The TPIM 134 converts direct current (DC) power from the HV battery 126 into alternating current (AC) power and applies AC power to the electric motor 118. For example, the TPIM 134 may convert the DC power from the HV battery 126 into 3-phase AC power and apply the 3-phase AC power to windings of the electric motor 118. The TPIM 134 also converts AC power output by the electric motor 118, such as during regenerative braking, into DC power and outputs the DC power to charge the HV battery 126. The TPIM 134 may be referred to as a power inverter module (PIM) or a transmission power inverter module in various implementations.

A steering control module 140 controls steering/turning of wheels of the vehicle, for example, based on driver turning of a steering wheel within the vehicle and/or steering commands from one or more vehicle control modules. A steering wheel angle sensor monitors rotational position of the steering wheel and generates a steering wheel angle (SWA) 142 based on the position of the steering wheel. As an example, the steering control module 140 may control vehicle steering via an electronic power steering (EPS) motor 144 based on the SWA 142. However, the vehicle may include another type of steering system. An electronic brake control module (EBCM) 150 may selectively control mechanical brakes 154 of the vehicle.

Modules of the vehicle may share parameters via a network 162, such as a controller area network (CAN). In vehicles, a CAN may also be referred to as a car area network. The network 162 may include one or more data buses. Various parameters may be made available by a given control module to other control modules via the network 162.

For example, a module may provide one or more driver inputs to the network 162. The driver inputs may include, for example, an accelerator pedal position (APP) 166 which may be provided to the ECM 106. A brake pedal position (BPP) 170 may be provided to the EBCM 150. A position 174 of a park, reverse, neutral, drive, low (PRNDL), or another suitable range selector may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, and crank.

An accessory power module (APM) 190 provides power to accessory loads 194 from a low voltage (LV) battery 198. The APM 190 includes a DC-DC converter that converts power from a DC voltage of the HV battery 126 into one or more other DC voltages, such as a DC voltage (e.g., approximately 12 volts) of the LV battery 198. Power output by the APM 190 may be provided directly to the accessory load 194 or from the LV battery 198. The APM 190 may also charge the LV battery 198 with power from the HV battery 126. By using the APM 190, the accessory loads 194 do not need to be redesigned to operate with the higher voltage output of the HV battery 126.

The vehicle may include one or more additional control modules that are not shown, such as a chassis control module, a battery pack control module, etc. The control modules may selectively transmit and receive data via the network 162. The vehicle may omit one or more of the control modules shown and discussed.

Figure 2:
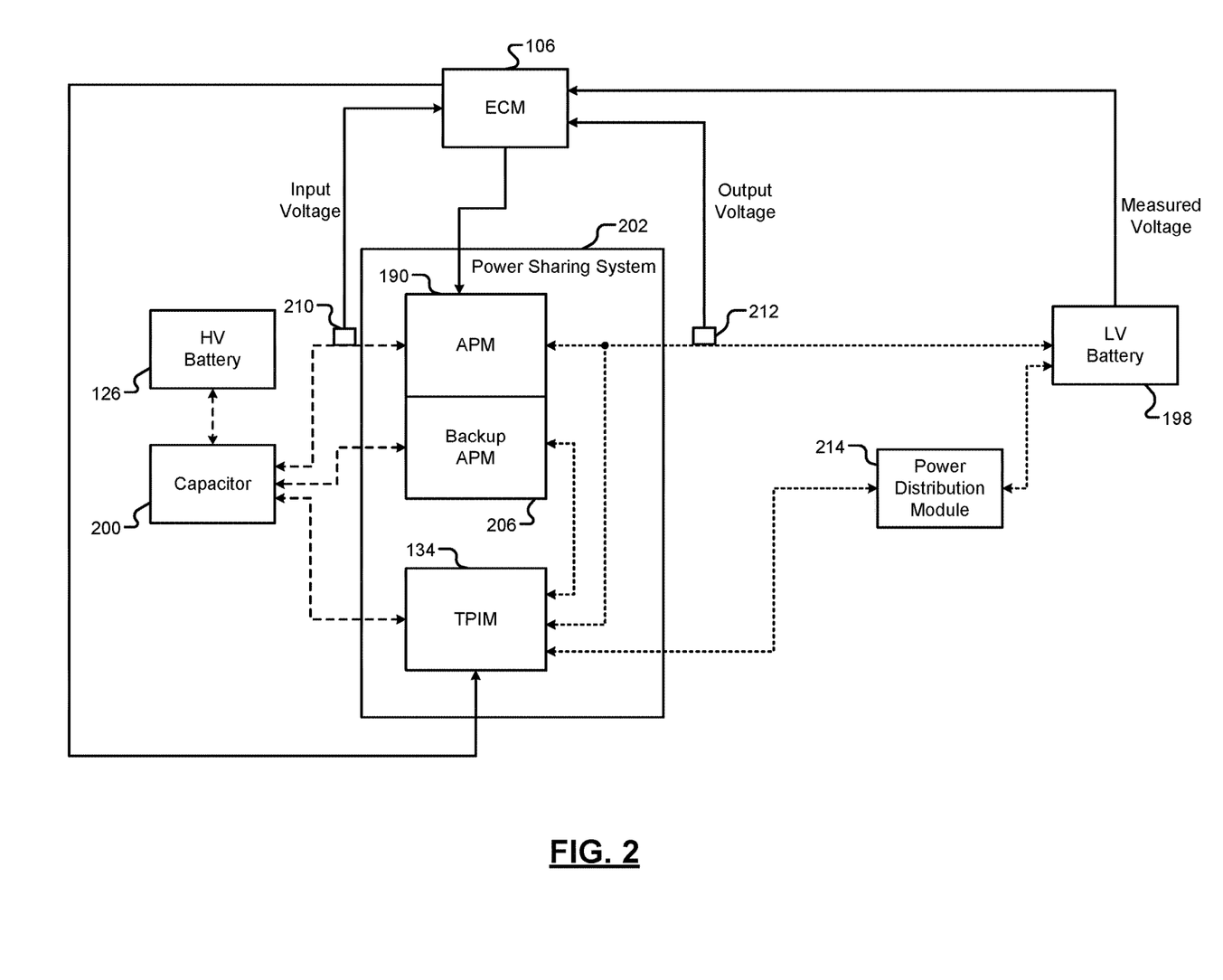
FIG. 2 is a functional block diagram of the example vehicle system including a discharge circuit.

Referring now to FIG. 2, a functional block diagram of the example vehicle system including a discharge circuit is presented. Solid lines in FIG. 2 are representative of electrical signals. Dashed lines are representative of a high voltage (HV) direct current (DC) bus. Dotted lines are representative of a low voltage (LV) direct current (DC) bus.

The term high voltage refers to a DC voltage used to propel the vehicle (e.g., such as the electric motor 118), such as 60 V DC, 300 V DC, 440 V DC, etc. The term low voltage refers to a DC voltage used to power accessory loads of the vehicle (e.g., such as the accessory loads 194), such as 12 V DC. The high voltage is greater than the low voltage.

The vehicle system includes a capacitor 200 that is electrically connected to the HV battery 126 via the HV DC bus. The HV DC bus includes a positive HV DC bus and a negative HV DC bus. The capacitor 200 stores the power received from the HV battery 126 bus and applies the power to a power sharing system 202. The power sharing system 202 integrates the TPIM 134, the APM 190, and a backup APM 206 into a housing unit.

As discussed above, the TPIM 134 may control the application of power to the electric motor 118. The TPIM 134 may include an inverter (also called a motor drive). For example, the inverter may be a 3-phase inverter. The inverter may be electrically connected to the capacitor 200 via the HV DC bus. The TPIM 134 may convert the DC power from the HV battery 126 into 3-phase AC power and apply the 3-phase AC power to windings of the electric motor 118. The HV battery 126 supplies high voltage to the HV DC bus. The high voltage may be, for example, approximately 60 V DC, 300 V DC, 440 V DC, etc. In various implementations, the HV battery 126 may include a capacitor, a high voltage electric power generator, or another high voltage power source.

The inverter may include a plurality of switch pairs that electrically connect in series between the positive and negative HV DC bus. Each switch of the plurality of switch pairs may be a power transistor, such as an insulated gate bipolar transistor (IGBT), field effect transistor (FET), metal oxide semiconductor field effect transistor (MOSFET), or another suitable power transistor. Each of the switch pairs corresponds to a phase of the electric motor 118. The inverter may include other electrical components (e.g., capacitors, resistors, etc.) to suppress electrical noise and perform load balancing. The TPIM 134 (e.g., a processor of the TPIM 134) controls switching of the switch pairs.

The APM 190 receives power from the HV DC bus and outputs power to the LV DC bus. The APM 190 includes the DC-DC converter. The APM 190 (e.g., a processor of the APM 190) controls the DC-DC converter to convert the high voltage from the HV DC bus to low voltage (e.g., approximately 12 V DC) and output the low voltage to the LV DC bus (e.g., approximately 12 volts). The power supplied to the LV DC bus may be used to charge the LV battery 198 and/or directly power the accessory loads 194.

The APM 190 has an input voltage and an output voltage. The input voltage may be measured or estimated based on a voltage of the HV battery 126. For example, the input voltage may be measured using an input voltage sensor 210. The input voltage sensor 210 measures a voltage of the HV DC bus. The output voltage may be measured or estimated based on the input voltage. For example, the output voltage may be measured using an output voltage sensor 212. The output voltage sensor 212 measures a voltage of the LV DC bus. The APM 190 may estimate the output voltage, for example, based on a lookup table or an equation that relates input voltages to output voltages.

The TPIM 134 may communicate with the APM 190 via the network 162. Additionally or alternatively, the TPIM 134 may communicate directly with the APM 190.

The backup APM 206 is electrically connected to the HV DC bus and the LV DC bus. In various implementations, the backup APM 206 may be similar to the APM 190. For example, the backup APM 206 may include a second DC-DC converter. The backup APM 206 (e.g., a processor of the backup APM 206) controls the second DC-DC converter to convert the high voltage from the HV DC bus to low voltage (e.g., approximately 12 V DC) and output the low voltage to the LV DC bus (e.g., approximately 12 volts). The backup APM 206 may operate when the APM 190 is unavailable, such as when a discharge fault condition occurs (e.g., short to ground fault condition, open fault condition, etc.).

The processor of the TPIM 134 may operate using the low voltage of the LV DC bus (e.g., approximately 12 volts). Redundant LV DC bus lines may allow the processor of the TPIM 134 to operate when the TPIM 134 experiences a brownout condition. The brownout condition may be, for example, a momentary loss of the low voltage on the LV DC bus. The redundant LV DC bus lines include a first line, second line, and third line. The first line electrically connects the TPIM 134 to the APM 190 and to the LV battery 198. The second line electrically connects the TPIM 134 to a power distribution module 214 and the power distribution module 214 to the LV battery 198. The third line electrically connects the TPIM 134 to the backup APM 206.

The power distribution module 214, such as an interior voltage electrical center, distributes power to the TPIM 134 and other LV components, such as the accessory loads 194. The power distribution module 214 may include a relay, fuse, switch, or another suitable power distribution component.

Figure 3:
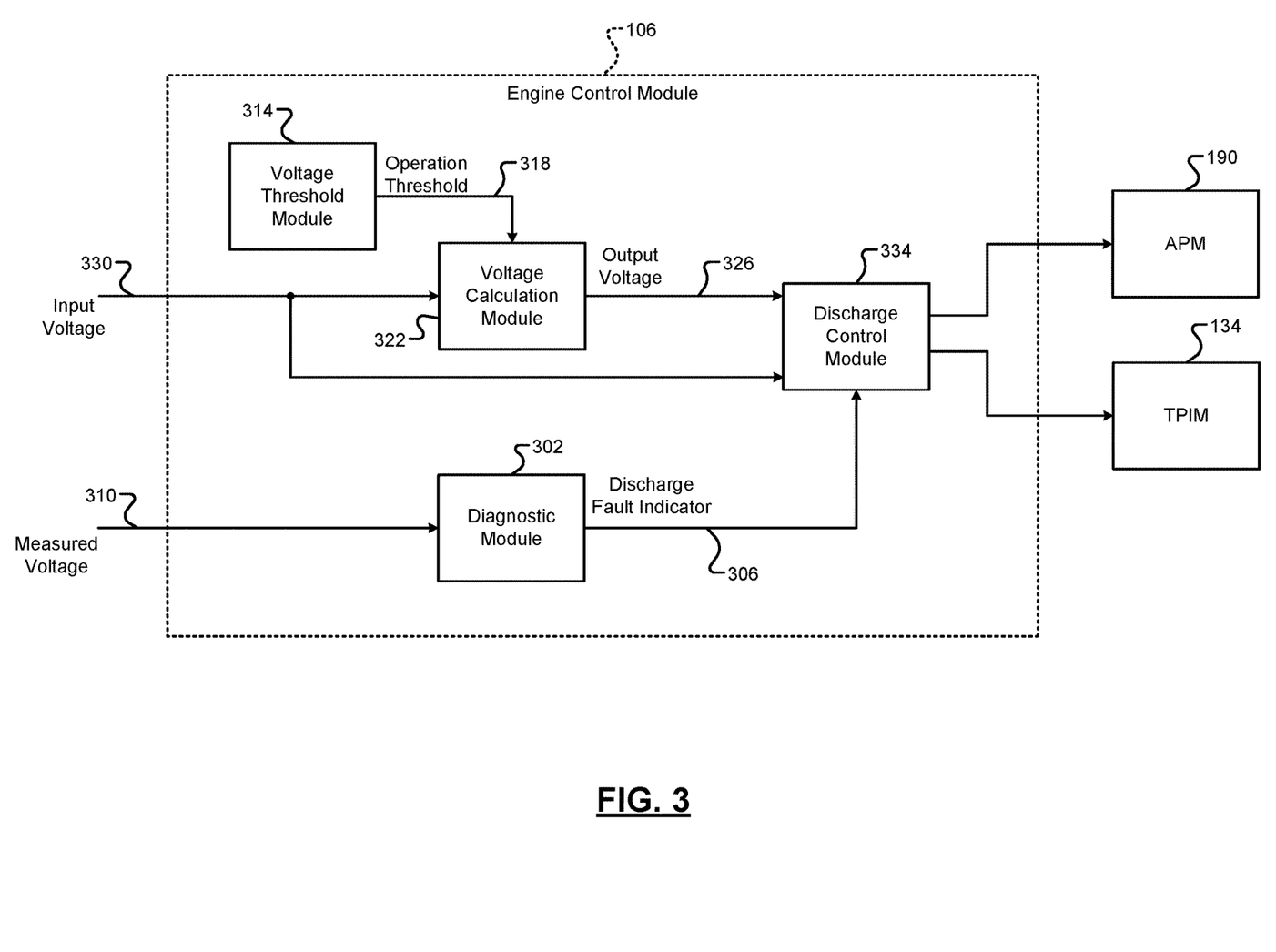
FIG. 3 is a functional block diagram of an example engine control module.

Referring now to FIG. 3, a functional block diagram of an example implementation of the ECM 106 is presented. A diagnostic module 302 determines whether a discharge fault is present based on a measured voltage 310 of the LV battery 198. The diagnostic module 302 generates a discharge fault indicator 306 indicative of whether a discharge fault is present. The measured voltage 310 corresponds to a voltage of the LV battery 198. The measured voltage 310 may be measured, for example, using a voltage sensor (e.g., the output voltage sensor 212 or a separate voltage sensor at the LV battery 198). The discharge fault indicator 306 indicates whether a fault condition is present. Examples of discharge fault conditions include short to ground faults and open circuit faults. For example, a short to ground fault condition may occur when the LV battery 198 is shorted to ground.

A voltage threshold module 314 determines an operation threshold voltage 318 based on characteristics of the HV battery 126, such as number of cells in the HV battery 126, battery density of each cell, etc. The operation threshold voltage 318 corresponds to a minimum voltage for operation of the APM 190. The operation threshold voltage 318 may be, for example, 220 volts for a class 88 to 104 cell battery and 189 volts for a class 72 to 84 cell battery. In various implementations, the operation threshold voltage 318 may be a fixed predetermined voltage.

A voltage calculation module 322 determines an output voltage 326 based on an input voltage 330 and the operation threshold voltage 318. When the input voltage 330 is greater than the operation threshold voltage 318, the voltage calculation module 322 may determine the output voltage 326 using a lookup table or an equation that relates input voltages to output voltages. The input voltage 330 corresponds to the input voltage of the APM 190. The input voltage 330 may be measured, for example, using the input voltage sensor 210. The output voltage 326 corresponds to the output voltage of the APM 190.

When the input voltage 330 is less than the operation threshold voltage 318, the voltage calculation module 322 may determine the output voltage 326 based on the input voltage 330 and the operation threshold voltage 318. The voltage calculation module 322 may determine the output voltage 326 using one of an equation and a lookup table that relates input voltages and operation threshold voltages to output voltages. For example, the voltage calculation module 322 may determine the output voltage 326 using the equation:

$$V_{out} = 15.5 * \frac{V_{in}}{V_{threshold}}, \quad (1)$$

where $V_{out}$ is the output voltage 326 of the APM 190, $V_{in}$ is the input voltage 330 of the APM 190, and $V_{threshold}$ is the operation threshold voltage 318 of the APM 190.

When the input voltage 330 is less than the operation threshold voltage 318 and a discharge fault is present (e.g., an open circuit fault condition), remedial action may be taken to prevent the APM 190 from entering standby mode and becoming inoperable. For example, a discharge control module 334 may delay the period before the APM 190 enters standby mode. The discharge control module 334 may delay the period, for example, by a second predetermined period (e.g., less than eight seconds) after the input voltage 330 becomes less than the operation threshold voltage 318. This may help the APM 190 operate in lower voltages (e.g., less than 220 volts) when a discharge fault is present (e.g., an open circuit fault condition). By operating the APM 190 at lower voltages, the APM 190 may be utilized to discharge the HV DC bus.

When the output voltage 326 is less than an output threshold voltage (e.g., 6.5 volts) and a discharge fault is present (e.g., a short to ground fault condition), the discharge control module 334 may extend the period of operation of the APM 190. During a short to ground fault condition, the APM 190 may operate, for example, in constant current mode to maintain a constant output current and to prevent sending current to the short to ground. The discharge control module 334 may extend the period of constant current mode operation of the APM 190, for example, by a third predetermined period (e.g., greater than eight seconds) after the output voltage 326 becomes less than the output threshold voltage. This may help the APM 190 operate in the constant current mode for a longer period when the discharge fault (e.g., a short to ground fault condition) occurs. This too may help utilize the APM 190 to discharge the HV DC bus.

As discussed above, the TPIM 134 may experience a brownout condition under some circumstances. The brownout condition may be, for example, a momentary (e.g., less than one second) loss of the low voltage (e.g., 12 V DC) on the LV DC bus. During the brownout condition, the APM 190 may provide current for the third predetermined period (e.g., greater than eight seconds) to the TPIM 134 while the APM 190 operates in the constant current mode. This helps the TPIM 134 ride through the brownout condition. Additionally or alternatively, upon recovery of the LV DC bus to at least the low voltage, the discharge control module 334 may wake-up the TPIM 134. The TPIM 134 may also be utilized to discharge the HV DC bus.

The discharge control module 334 determines whether to perform a first discharge based on the input voltage 330 and the output voltage 326. For example, the discharge control module 334 determines to perform the first discharge when the input voltage 330 is greater than a first HV threshold and/or the output voltage 326 is greater than a first LV threshold. For example, the first HV threshold may be 115 volts, 220 volts, 400 volts, or another voltage that is less than the high voltage. The first LV threshold may be, for example, 7.5 volts, 12 volts, or another voltage that is less than the low voltage.

The discharge control module 334 operates the TPIM 134 and APM 190 to perform the first discharge. During the first discharge, the TPIM 134 may discharge the HV DC bus through operation of the processor of the TPIM 134 and by applying the 3-phase AC power to the windings of the electric motor 118. The APM 190 may discharge the HV DC bus through operation of the processor of the APM 190 and by converting power from the HV DC bus to the LV DC bus. In various implementations, the discharge control module 334 may operate other components of the vehicle, such as an electric (e.g., resistive) heater, a compressor (e.g., an air conditioning compressor), a vehicle interface control module (VICM), and/or one or more other components to discharge the HV DC bus.

The discharge control module 334 determines whether to perform a second discharge based on the input voltage 330 and the output voltage 326. For example, the discharge control module 334 determines to perform the second discharge when the input voltage 330 is less than the first HV threshold and greater than a second HV threshold, and/or the output voltage 326 is less than the first LV threshold and greater than a second LV threshold. For example, the second HV threshold may be 92 volts and the second LV threshold may be 6 volts. The second HV threshold is less than the first HV threshold, and the second LV threshold is less than the first LV threshold.

The discharge control module 334 operates the TPIM 134 and APM 190 to perform the second discharge. During the second discharge, the TPIM 134 may discharge the HV DC bus through operation of the processor of the TPIM 134. The APM 190 may discharge the HV DC bus through operation of the processor of the APM 190 and by converting power from the HV DC bus to the LV DC bus. In various implementations, the discharge control module 334 may operate other components of the vehicle, such as the VICM, during the second discharge to discharge the HV DC bus.

The discharge control module 334 determines whether to perform a third discharge based on the input voltage 330 and the output voltage 326. For example, the discharge control module 334 determines to perform the third discharge when the input voltage 330 is less than the second HV threshold and greater than a third HV threshold, and/or the output voltage 326 is less than the second LV threshold and greater than a third LV threshold. For example, the third HV threshold may be 60 volts and the third LV threshold may be 3.9 volts. The third HV threshold is less than the second HV threshold, and the third LV threshold is less than the second LV threshold.

The discharge control module 334 operates the APM 190 during the third discharge. During the third discharge, the APM 190 may discharge the HV DC bus through operation of the processor of the APM 190.

Figure 4:
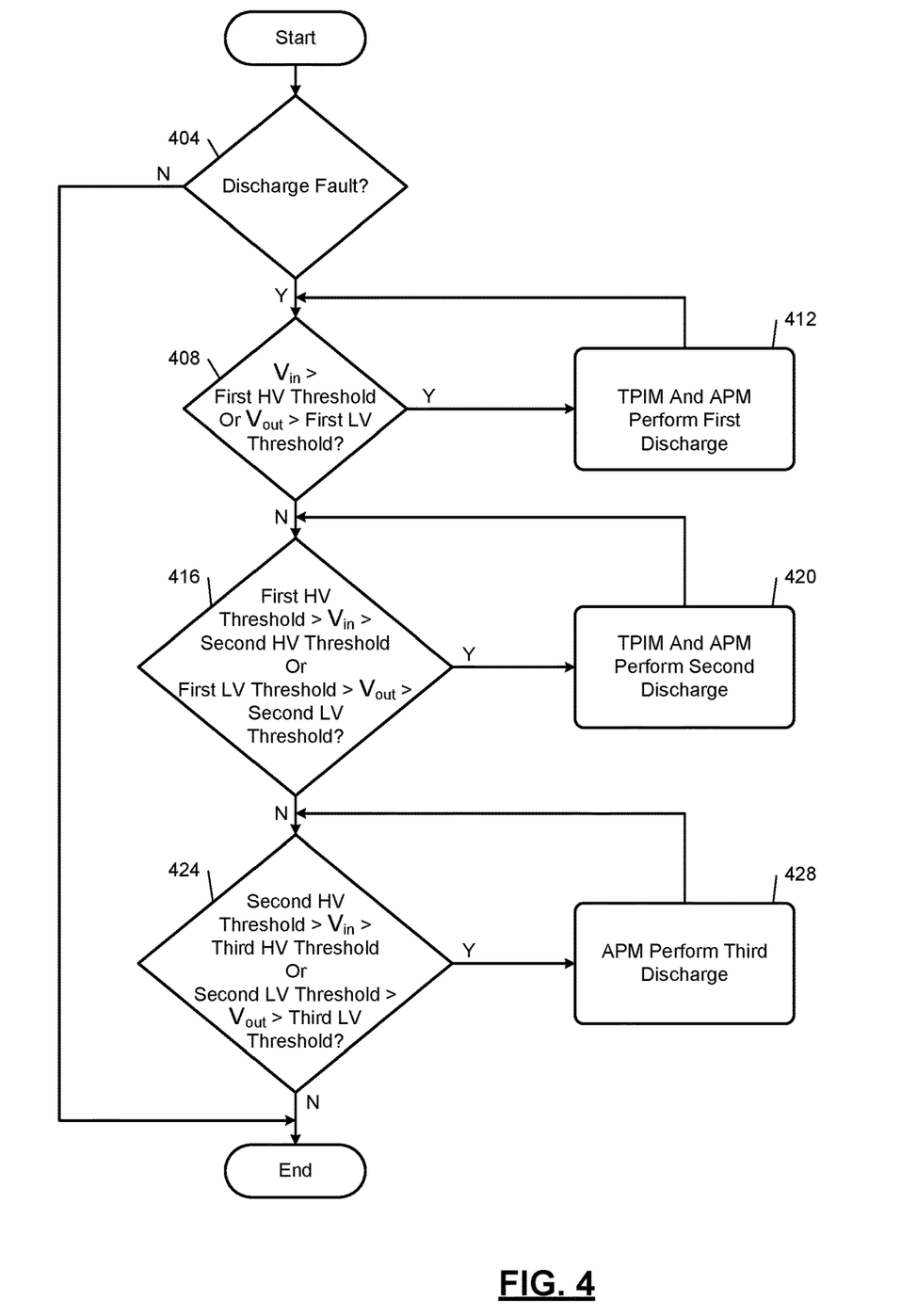
FIG. 4 is a flowchart depicting an example method of discharging a high voltage direct current bus.

FIG. 4 is a flowchart depicting an example method of discharging the HV DC bus. Control begins with 404 where the diagnostic module 302 determines whether a discharge fault (e.g., short to ground fault condition or open circuit fault condition) is present. If 404 is true, control continues with 408. If 404 is false, control ends.

At 408, the discharge control module 334 determines whether the input voltage 330 is greater than the first HV threshold and/or whether the output voltage 326 is greater than the first LV threshold. If 408 is true, control transfers to 412. If 408 is false, control continues to 416.

At 412, the discharge control module 334 operates the TPIM 134 and the APM 190 to perform the first discharge. For example, the TPIM 134 may discharge the HV DC bus through operation of the processor of the TPIM 134 and by applying the 3-phase AC power to the windings of the electric motor 118. The APM 190 may discharge the HV DC bus through operation of the processor of the APM 190 and by converting power from the HV DC bus to the LV DC bus.

At 416, the discharge control module 334 determines whether the input voltage 330 is less than the first HV threshold and greater than the second HV threshold, and/or whether the output voltage 326 is less than the first LV threshold and greater than the second LV threshold. If 416 is true, control transfers to 420 where the discharge control module 334 operates the TPIM 134 and the APM 190 to perform the second discharge. For example, the TPIM 134 may discharge the HV DC bus through operation of the processor of the TPIM 134. The APM 190 may discharge the HV DC bus through operation of the processor of the APM 190 and by converting power from the HV DC bus to the LV DC bus. If 416 is false, control continues to 424.

At 424, the discharge control module 334 determines whether the input voltage 330 is less than the second HV threshold and greater than the third HV threshold, and/or whether the output voltage 326 is less than the second LV threshold and greater than the third LV threshold. If 424 is true, control transfers to 428 where the discharge control module 334 operates the APM 190 to perform the third discharge. For example, the APM 190 may discharge the HV DC bus through operation of the processor of the APM 190.

If 424 is false, control ends. While control is shown and discussed as ending, the example of FIG. 4 may be illustrative of one control loop and control may return to 404.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different orders (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:
1. A discharge control system of a vehicle, comprising:
a traction power inverter module (TPIM) configured to convert a first direct current (DC) voltage output by a first battery to alternating current (AC) power and to apply the AC power to an electric motor;
an accessory power module (APM) configured to convert the first DC voltage into a second DC voltage of a second battery,
wherein the second DC voltage is less than the first DC voltage;
a voltage calculation module configured to, when the first DC voltage is less than an operation threshold voltage of the APM, determine the second DC voltage based on a function of the first DC voltage and the operation threshold voltage;
a diagnostic module configured to indicate whether a discharge fault is present; and
a discharge control module configured to, when the discharge fault is present, based on at least one of the first DC voltage and the second DC voltage, selectively control operation of at least one of (i) the TPIM and (ii) the APM.

2. The discharge control system of claim 1 wherein the discharge control module is configured to, when the first DC voltage is greater than a first high voltage (HV) threshold and the discharge fault is present, at least one of:
operate the TPIM to apply the AC power to windings of the electric motor; and
operate the APM to convert the first DC voltage into the second DC voltage.

3. The discharge control system of claim 2 wherein the discharge control module is configured to, when the first DC voltage is less than the first HV threshold and greater than a second HV threshold and the discharge fault is present, at least one of:
operate the TPIM to apply the AC power to windings of the electric motor; and
operate the APM to convert the first DC voltage into the second DC voltage.

4. The discharge control system of claim 3 wherein the discharge control module is configured to, when the first DC voltage is less than the second HV threshold and greater than a third HV threshold and the discharge fault is present, operate the APM to convert the first DC voltage into the second DC voltage and not operate the TPIM to apply the AC power to windings of the electric motor.

5. The discharge control system of claim 1 wherein the discharge control module is configured to, when the second DC voltage is greater than a first low voltage (LV) threshold and the discharge fault is present, at least one of:
operate the TPIM to apply the AC power to windings of the electric motor; and
operate the APM to convert the first DC voltage into the second DC voltage.

6. The discharge control system of claim 5 wherein the discharge control module is configured to, when the second DC voltage is less than the first LV threshold and greater than a second LV threshold and the discharge fault is present, at least one of:
operate the TPIM to apply the AC power to windings of the electric motor; and
operate the APM to convert the first DC voltage into the second DC voltage.

7. The discharge control system of claim 6 wherein the discharge control module is configured to, when the second DC voltage is less than the second LV threshold and greater than a third LV threshold and the discharge fault is present, operate the APM to convert the first DC voltage into the second DC voltage and not operate the TPIM to apply the AC power to windings of the electric motor.

8. The discharge control system of claim 1 wherein the discharge control module is configured to:
when the first DC voltage is greater than a first high voltage (HV) threshold and the discharge fault is present:
operate the TPIM to apply the AC power to windings of the electric motor; and
operate the APM to convert the first DC voltage into the second DC voltage; and
when the second DC voltage is greater than a first low voltage (LV) threshold and the discharge fault is present:
operate the TPIM to apply the AC power to windings of the electric motor; and
operate the APM to convert the first DC voltage into the second DC voltage.

9. The discharge control system of claim 8 wherein the discharge control module is configured to:
when the first DC voltage is less than the first HV threshold and greater than a second HV threshold and the discharge fault is present:
operate the TPIM to apply the AC power to windings of the electric motor; and
operate the APM to convert the first DC voltage into the second DC voltage; and
when the second DC voltage is less than the first LV threshold and greater than a second LV threshold and the discharge fault is present:
operate the TPIM to apply the AC power to windings of the electric motor; and
operate the APM to convert the first DC voltage into the second DC voltage.

10. The discharge control system of claim 9 wherein the discharge control module is configured to:
when the first DC voltage is less than the second HV threshold and greater than a third HV threshold and the discharge fault is present, operate the APM to convert the first DC voltage into the second DC voltage and not operate the TPIM to apply the AC power to windings of the electric motor; and
when the second DC voltage is less than the second LV threshold and greater than a third LV threshold and the discharge fault is present, operate the APM to convert the first DC voltage into the second DC voltage and not operate the TPIM to apply the AC power to windings of the electric motor.

11. The discharge control system of claim 1 wherein the discharge control module is further configured to, when the first DC voltage is less than the operation threshold voltage and the discharge fault is present, maintain operation of the APM for a second predetermined period.

12. The discharge control system of claim 11 wherein the discharge control module is further configured to, when the second DC voltage is less than the operation threshold voltage and the discharge fault is present, maintain operation of the APM in current mode for a third predetermined period.

13. The discharge control system of claim 12 wherein:
the second predetermined period is less than eight seconds; and
the third predetermined period is greater than eight seconds.

14. The discharge control system of claim 12 wherein the APM is further configured to, when the second DC voltage falls below a predetermined voltage for less than a fourth predetermined period and subsequently becomes greater than the fourth predetermined period, provide current to the TPIM for the third predetermined period.

15. The discharge control system of claim 12 wherein the discharge control module is further configured to, when the second DC voltage falls below a predetermined voltage for less than a fourth predetermined period and subsequently becomes greater than the fourth predetermined period, wake-up the TPIM.

16. A discharge control method for a vehicle, comprising:
by a traction power inverter module (TPIM), converting a first direct current (DC) voltage output by a first battery to alternating current (AC) power and applying the AC power to an electric motor;
by an accessory power module (APM), converting the first DC voltage into a second DC voltage of a second battery,
wherein the second DC voltage is less than the first DC voltage;
when the first DC voltage is less than an operation threshold voltage of the APM, determining the second DC voltage based on a function of the first DC voltage and the operation threshold voltage;
indicating whether a discharge fault is present; and
when the discharge fault is present, based on at least one of the first DC voltage and the second DC voltage, selectively controlling operation of at least one of (i) the TPIM and (ii) the APM.

17. The discharge control method of claim 16 further comprising, when the first DC voltage is greater than a first high voltage (HV) threshold and the discharge fault is present, at least one of:
operating the TPIM to apply the AC power to windings of the electric motor; and
operating the APM to convert the first DC voltage into the second DC voltage.

18. The discharge control method of claim 17 further comprising, when the first DC voltage is less than the first HV threshold and greater than a second HV threshold and the discharge fault is present, at least one of:
operating the TPIM to apply the AC power to windings of the electric motor; and
operating the APM to convert the first DC voltage into the second DC voltage.

19. The discharge control method of claim 18 further comprising, when the first DC voltage is less than the second HV threshold and greater than a third HV threshold and the discharge fault is present, operating the APM to convert the first DC voltage into the second DC voltage and not operating the TPIM to apply the AC power to windings of the electric motor.

20. The discharge control method of claim 16 further comprising, when the second DC voltage is greater than a first low voltage (LV) threshold and the discharge fault is present, at least one of:
operating the TPIM to apply the AC power to windings of the electric motor; and
operating the APM to convert the first DC voltage into the second DC voltage.

* * * * *